(12) United States Patent
Chappell et al.

(10) Patent No.: US 10,996,753 B1
(45) Date of Patent: May 4, 2021

(54) MULTI-MODE EYE-TRACKING WITH INDEPENDENTLY OPERABLE ILLUMINATORS

(71) Applicant: EyeTech Digital Systems, Inc., Mesa, AZ (US)

(72) Inventors: Robert C. Chappell, Mesa, AZ (US); James Wesley Rogers, Jr., Mesa, AZ (US); Miles Manning, Gilbert, AZ (US)

(73) Assignee: EyeTech Digital Systems, Inc., Mesa, AZ (US)

( * ) Notice: Subject to any disclaimer, the term of this patent is extended or adjusted under 35 U.S.C. 154(b) by 0 days.

(21) Appl. No.: 16/842,514

(22) Filed: Apr. 7, 2020

(51) Int. Cl.
  *G06F 3/01* (2006.01)
  *H05B 47/13* (2020.01)
  *G06T 7/00* (2017.01)
  *H05B 47/125* (2020.01)

(52) U.S. Cl.
  CPC ............ *G06F 3/013* (2013.01); *G06T 7/0012* (2013.01); *H05B 47/125* (2020.01); *H05B 47/13* (2020.01); *G06T 2207/30041* (2013.01)

(58) Field of Classification Search
  CPC ................. G06F 3/013; G06T 7/0012; G06T 2207/30041; H05B 47/125; H05B 47/13
  See application file for complete search history.

(56) References Cited

U.S. PATENT DOCUMENTS

| | | | |
|---|---|---|---|
| 5,367,315 A | 11/1994 | Pan | |
| 7,572,008 B2 * | 8/2009 | Elvesjo | A61B 3/113 351/206 |
| 8,350,889 B1 | 1/2013 | Shammoh | |
| 9,185,352 B1 * | 11/2015 | Jacques | H04N 7/18 |
| 9,612,656 B2 * | 4/2017 | Sztuk | G06F 3/013 |
| 10,061,383 B1 * | 8/2018 | Ludusan | G06K 9/2018 |
| 10,157,313 B1 | 12/2018 | Zhang et al. | |
| 10,402,649 B2 | 9/2019 | Rabinovich et al. | |
| 10,521,661 B2 * | 12/2019 | Chen | G06K 9/00604 |
| 10,636,158 B1 | 4/2020 | Kamiyama et al. | |

(Continued)

OTHER PUBLICATIONS

U.S. Appl. No. 16/434,830, filed Jun. 7, 2019; Robert C. Chappell et al. "Devices and Methods for Reducing Computational and Transmission Latencies in Cloud Base Eye Tracking Systems".

(Continued)

*Primary Examiner* — Carolyn R Edwards
(74) *Attorney, Agent, or Firm* — Jennings, Strouss & Salmon PLC; Daniel R. Pote (57) ABSTRACT

A multi-mode eye-tracking system allows independent control of a set of illuminators while providing accurate calculations of both corneal reflections and pupil centers. One illumination mode includes alternating back and forth between a pair of illuminators during successive time segments, then activating both illuminators after a predetermined time interval. One eye-tracking mode includes alternating back and forth between a pair of illuminators during successive time segments, but selecting a single illuminator for activation during successive time segments in the event that a previous computation was unsatisfactory for a given illuminator. One illumination mode includes activating a single illuminator based on the lateral position of the gaze point on the display.

12 Claims, 7 Drawing Sheets

(56) References Cited

U.S. PATENT DOCUMENTS

| | | | |
|---|---|---|---|
| 2013/0293488 A1* | 11/2013 | Na | G06F 3/016 |
| | | | 345/173 |
| 2014/0168056 A1 | 6/2014 | Swaminathan et al. | |
| 2014/0225131 A1 | 8/2014 | Benson et al. | |
| 2015/0160726 A1* | 6/2015 | Sullivan | G02B 27/0093 |
| | | | 345/156 |
| 2015/0223684 A1* | 8/2015 | Hinton | G06K 9/00604 |
| | | | 351/210 |
| 2015/0227735 A1 | 8/2015 | Chappell | |
| 2016/0106315 A1 | 4/2016 | Kempinski | |
| 2016/0262685 A1 | 9/2016 | Wagner et al. | |
| 2016/0270655 A1* | 9/2016 | Caraffi | A61B 3/0025 |
| 2017/0068287 A1 | 3/2017 | Jung et al. | |
| 2017/0188823 A1 | 7/2017 | Ganesan et al. | |
| 2017/0285741 A1* | 10/2017 | Park | G06K 9/00617 |
| 2018/0089834 A1 | 3/2018 | Spizheroy et al. | |
| 2018/0181809 A1 | 6/2018 | Ranjan et al. | |
| 2018/0307270 A1 | 10/2018 | Pantel | |
| 2019/0087973 A1 | 3/2019 | Kaehler et al. | |
| 2019/0102905 A1 | 4/2019 | Skogo | |
| 2019/0302973 A1 | 10/2019 | Engelke et al. | |
| 2019/0303724 A1 | 10/2019 | Linden | |
| 2019/0317597 A1 | 10/2019 | Aleem et al. | |
| 2019/0324532 A1 | 10/2019 | Aleem et al. | |
| 2020/0104589 A1* | 4/2020 | Sengelaub | G06T 7/74 |
| 2020/0110271 A1 | 4/2020 | Komogortser et al. | |
| 2020/0134868 A1 | 4/2020 | Liu et al. | |
| 2020/0143189 A1* | 5/2020 | Shiota | H04N 5/2354 |
| 2020/0153768 A1 | 5/2020 | Cohen | |
| 2020/0193206 A1 | 6/2020 | Turkelson et al. | |

OTHER PUBLICATIONS

Xuan Li et al, "An Efficient Robust Eye Localization by Learning the Convolution Distribution Using Eye Template", Computional Intelligence and Neuroscience, Oct. 2015, vol. 2015, 21pgs.

* cited by examiner

MULTI-MODE EYE-TRACKING WITH INDEPENDENTLY OPERABLE ILLUMINATORS

TECHNICAL FIELD

The present invention relates, generally, to eye-tracking systems and methods and, more particularly, to the use of infrared illuminators in connection with such eye-tracking systems.

BACKGROUND

Eye-tracking systems, such as those used in conjunction with desktop computers, laptops, tablets, head-mounted displays and other such computing devices that include a display, generally incorporate one or more illuminators (e.g., near-infrared LEDs) for directing infrared light to the user's eyes, and a camera assembly for capturing, at a suitable frame rate, reflected images of the user's face for further processing. By determining the relative locations of the user's pupils (i.e., the pupil centers, or PCs) and the corneal reflections (CRs) in the reflected images, the eye-tracking system can accurately predict the user's gaze point on the display.

Traditionally, in systems that include two IR LEDs, both LEDs are activated or strobed every time segment (which may or may not correlate to a frame) although not always for the full duration of the time segment. While the PC of each eye is typically determined by analyzing the shape of the pupil perimeter, the CRs themselves can partially occlude the pupil perimeter and thereby reduce PC calculation accuracy. On the other hand, the distance from the eye-tracking system to the user's face is typically determined, in part, based on the distance between the two CRs, necessitating the illumination of two LEDs each time segment.

In addition to the above, some eye-tracking systems have difficulty in adapting to the types of errors in PC and CR computation that might result from glare from the user's glasses or other external factors. Furthermore, some eye-tracking have difficulty in determining both CRs when the user's gaze point lingers toward the left or right extremes of the display. Systems and methods are therefore needed that overcome these and other limitations of the prior art.

SUMMARY OF THE INVENTION

Various embodiments of the present invention relate to systems and methods for, inter alia: i) providing a multi-mode eye-tracking system that allows independent control of the illuminators while providing accurate calculations of both corneal reflections and pupil centers; ii) providing an eye-tracking illumination mode that includes alternating back and forth between a pair of illuminators during successive time segments, then activating both illuminators after a predetermined time interval in order to calculate a user distance measurement; iii) providing an eye-tracking illumination mode that includes alternating back and forth between a pair of illuminators during successive time segments, but selecting a single illuminator for activation during successive time segments in the event that a previous computation was unsatisfactory for a given illuminator; iv) providing an eye-tracking illumination mode that includes activating a single illuminator based on the lateral position of the gaze point on the display; and v) providing an adaptive, multi-modal eye-tracking system in which the illumination mode is selected in response to user behavior and one or more metrics associated with PR and CR accuracy.

BRIEF DESCRIPTION OF THE DRAWING FIGURES

The present invention will hereinafter be described in conjunction with the appended drawing figures, wherein like numerals denote like elements, and.

DETAILED DESCRIPTION OF PREFERRED EXEMPLARY EMBODIMENTS

The present subject matter relates to systems and methods for an adaptive, multi-mode eye-tracking system in which the illuminators are individually operable to provide accurate calculations of both corneal reflections and pupil centers.

As a preliminary matter, it will be understood that the following detailed description is merely exemplary in nature and is not intended to limit the inventions or the application and uses of the inventions described herein. Furthermore, there is no intention to be bound by any theory presented in the preceding background or the following detailed description. In the interest of brevity, conventional techniques and components related to eye-tracking algorithms, image sensors, IR illuminators, and digital image processing may not be described in detail herein.

Figure 1:
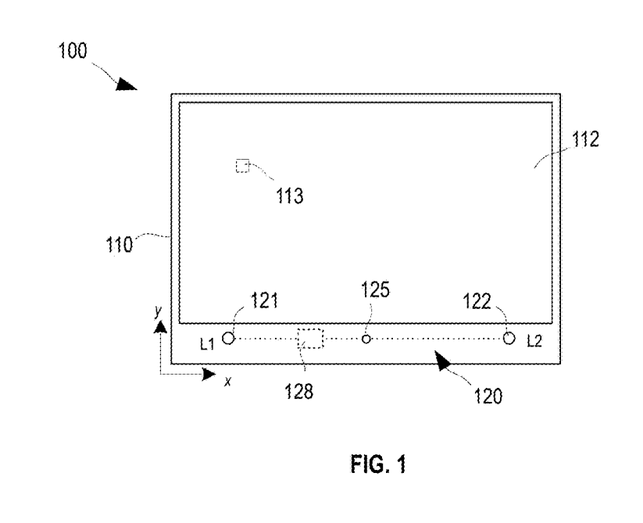
FIG. 1 is a conceptual overview of a computing device and eye-tracking system in accordance with various embodiments.
Figure 2A:
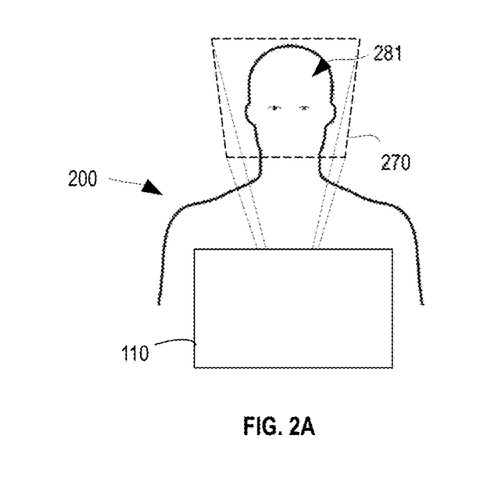
FIGS. 2A and 2B are front and side views, respectively, of a user interacting with an eye-tracking system in accordance with various embodiments.
Figure 2B:
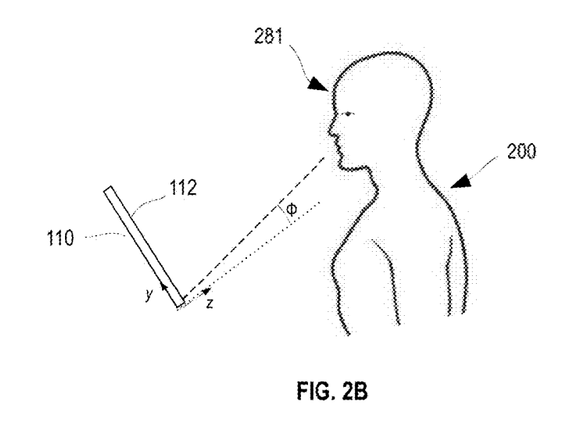
Figure 2C:
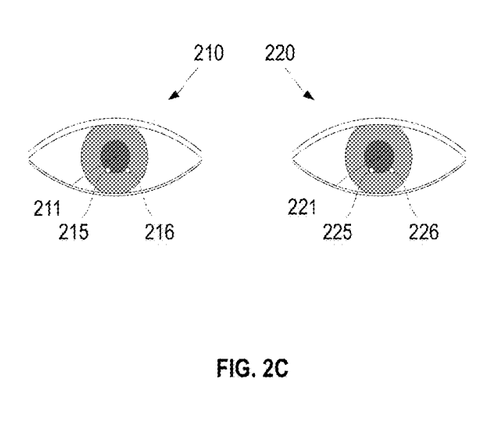
FIG. 2C illustrates the determination of pupil centers (PCs) and corneal reflections (CRs) in accordance with various embodiments.

Referring first to FIG. 1 in conjunction with FIGS. 2A-2C, the present invention may be implemented in the context of a system 100 that includes a computing device 110 (e.g., a desktop computer, tablet computer, laptop, smart-phone, head-mounted display, television panels, dashboard-mounted automotive systems, or the like) having a display 112 and an eye-tracking assembly 120 coupled to, integrated into, or otherwise associated with device 110. It will be appreciated that embodiments of the present invention are not limited to the particular shape, size, and type of computing devices 110 illustrated in the figures.

Eye-tracking assembly 120 includes one or more infrared (IR) light sources, such as light emitting diodes (LEDs) 121 and 122 (alternatively referred to as "L1" and "L2" respectively) that are independent operable to illuminate the facial region 281 of a user 200, while one or more camera assemblies (e.g., camera assembly 125) are provided for acquiring, at a suitable frame-rate, reflected IR light from user's facial region 281 within a field-of-view 270. As mentioned previously above, in traditional eye-tracking systems L1 and L2 are both typically activated during every frame; however, in accordance with the present invention, various illumination modes are provided for selectively activating one, all, or none of the illuminators 121, 122 during a given frame.

Eye-tracking assembly may include one or more processors (e.g., processor 128) configured to direct the operation of LEDs 121, 122 and camera assembly 125. Eye-tracking assembly 120 is preferably positioned adjacent to the lower edge of screen 112 (relative to the orientation of device 110 as used during normal operation).

System 100, utilizing computing device 110 (and/or a remote cloud-based image processing system) determines the pupil centers (PCs) and corneal reflections (CRs) for each eye—e.g., PC 211 and CRs 215, 216 for the user's right eye 210, and PC 221 and CRs 225, 226 for the user's left eye 220. The system 100 then processes the PC and CR data (the "image data"), as well as other available information (e.g., head position/orientation for user 200), and determines the location of the user's gaze point 113 on display 112. The gaze point 113 may be characterized, for example, by a tuple (x, y) specifying linear coordinates (in pixels, centimeters, or other suitable unit) relative to an arbitrary reference point on display screen 112. The determination of gaze point 113 may be accomplished in a variety of ways, e.g., through calibration methods or the use of eye-in-head rotations and head-in-world coordinates to geometrically derive a gaze vector and its intersection with display 112, as is known in the art.

In general, the phrase "eye-tracking data" as used herein refers to any data or information directly or indirectly derived from an eye-tracking session using system 100. Such data includes, for example, the stream of images produced from the users' facial region 281 during an eye-tracking session ("image data"), as well as any numeric and/or categorical data derived from the image data, such as gaze point coordinates, corneal reflection and pupil center data, saccade (and micro-saccade) information, and non-image frame data. More generally, such data might be include information regarding fixations (phases when the eyes are stationary between movements), saccades (rapid and involuntary eye movements that occur between fixations) scan-path (series of short fixations and saccades alternating before the eyes reach a target location on the screen), duration (sum of all fixations made in an area of interest), blink (quick, temporary closing of eyelids), and pupil size (which might correlate to cognitive workload, etc.).

In some embodiments, image data may be processed locally (i.e., within computing device 110 and/or processor 128) using an installed software client. In some embodiments, however, eye tracking is accomplished using an image processing module remote from computing device 110—e.g., hosted within a cloud computing system communicatively coupled to computing device 110 over a network (not shown). In such embodiments, the remote image processing module performs all or a portion of the computationally complex operations necessary to determine the gaze point 113, and the resulting information is transmitted back over the network to computing device 110. An example cloud-based eye-tracking system that may be employed in the context of the present invention is illustrated in U.S. patent application Ser. No. 16/434,830, entitled "Devices and Methods for Reducing Computational and Transmission Latencies in Cloud Based Eye Tracking Systems," filed Jun. 7, 2019, the contents of which are hereby incorporated by reference.

Figure 3:
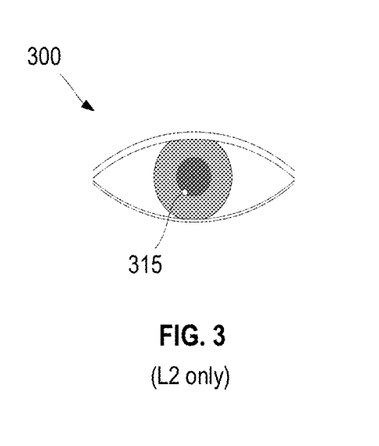
FIGS. 3, 4, and 5 depict eye images corresponding to various LED activation states.
Figure 4:
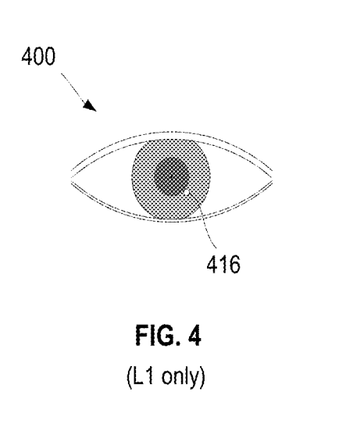
Figure 5:
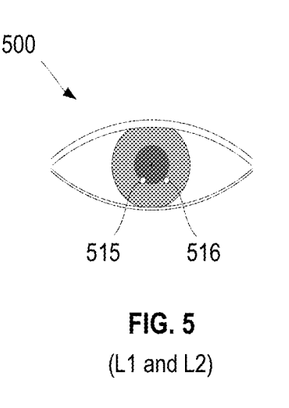

Referring to the eye images 300, 400, and 500 provided in FIGS. 3-5, an eye-tracking assembly 120 in accordance with various embodiments includes individually operable illuminators (e.g., L1 and L2 in FIG. 1), which together have four distinct activation states: (1) illumination of only L2 (resulting in CR 315, FIG. 3); (2) illumination of only L1 (resulting in CR 416, FIG. 4); (3) illumination of both L1 and L2 (resulting in CRs 515 and 516, FIG. 5), and (4) illumination of neither L1 nor L2 (not shown). As will be shown below, the use of individually operable IR LEDs allows eye-tracking assembly 120 to provide a number of advantageous illumination modes.

As used herein, the term "illumination mode" refers to a set of activation states and the rules for selecting between those activation states for any particular frame. The term "activation state" refers to the collection of states (e.g., on/off) of all illuminators at any given time. While the present embodiments are illustrated in the context of an eye-tracking system having exactly two illuminators (L1 and L2), the invention is not so limited, and may be used to control any number of illuminators, as may be required for a particular application.

Illumination Mode Example 1

Figure 6:
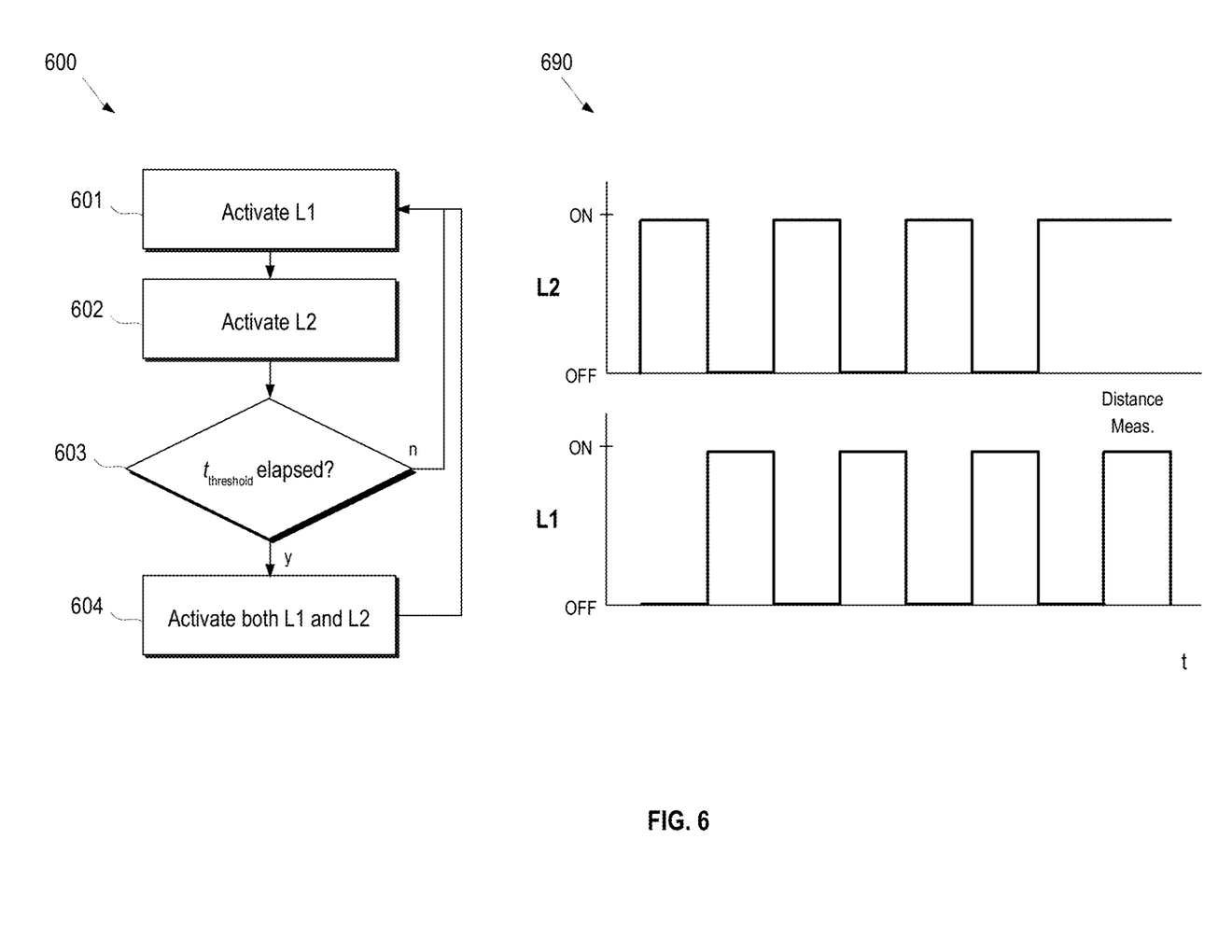
FIG. 6 is a conceptual block diagram and associated timing diagram for an illumination mode including alternating activation of a pair of LEDs.

FIG. 6 includes a flowchart 600 and associated timing diagram 690 for an illumination mode characterized by alternating back and forth between a pair of illuminators during successive time segments, then activating both illuminators after a predetermined time interval in order to calculate a user distance measurement.

As a preliminary matter, the term "time segments" is intended to refer to any predetermined interval occurring in succession. In some embodiments, the time segments might substantially correspond to the acquisition of individual frames by the eye-tracking camera. In some embodiments, the time segments might correspond to the time during which one or more of the IR LEDs is illuminated.

With continued reference to FIG. 6, in the illustrated mode, there are three distinct activation states: L1 only activated (step 601); L2 only activated (step 602), and L1 and L2 both activated (step 604)—which only occurs periodically after some predetermined time has elapsed ($t_{threshold}$) (step 603). This interval may be, for example, between 0.5 and 2.0 seconds (e.g., 1.0 second). The system loops through these activates as shown, and as depicted in the timing diagram 690. While timing diagram 690 suggests that a particular illuminator is activated for the duration of an entire time segment, in practical embodiments the illuminator will only be "strobed" only during that time interval that the user's eyes are being scanned by the camera.

While not illustrated in flowchart 600, it will be understood that the system also calculates PC, CR, and gaze-point data in each of the steps 601, 602, and 604. During steps 601 and 602, however, only a single CR computation is available during that time segment. In such cases, the previous value is used for the missing CR. That is, it is assumed that the frame rate is sufficiently high that the frame-to-frame variation of a single CR is not likely to generate a significant error in the calculations based on that CR location. The distance between CRs ($CR_{dist}$) can be calculated based on this past value, or the past value of the user distance measurement itself can be reused. Furthermore, the intermittent calculations using both L1 and L2 (step 604) provides an error correction function and provides, every $t_{threshold}$ seconds, a sufficiently accurate user distance measurement. In one variation of this embodiment, for the purposes of simplicity and reducing computational complexity, step 603 and 604 are removed, and the system merely alternates between L1 and L2.

Generally speaking, the illumination mode shown in FIG. 6 is advantageous in that, by generally illuminating only one LED at a time, the system can calculate a very precise PC measurement. At the same time, the intermittent activation of both LEDs allows for a reasonably precise $CR_{dist}$ and user distance measurement.

Illumination Mode Example 2

Figure 7:
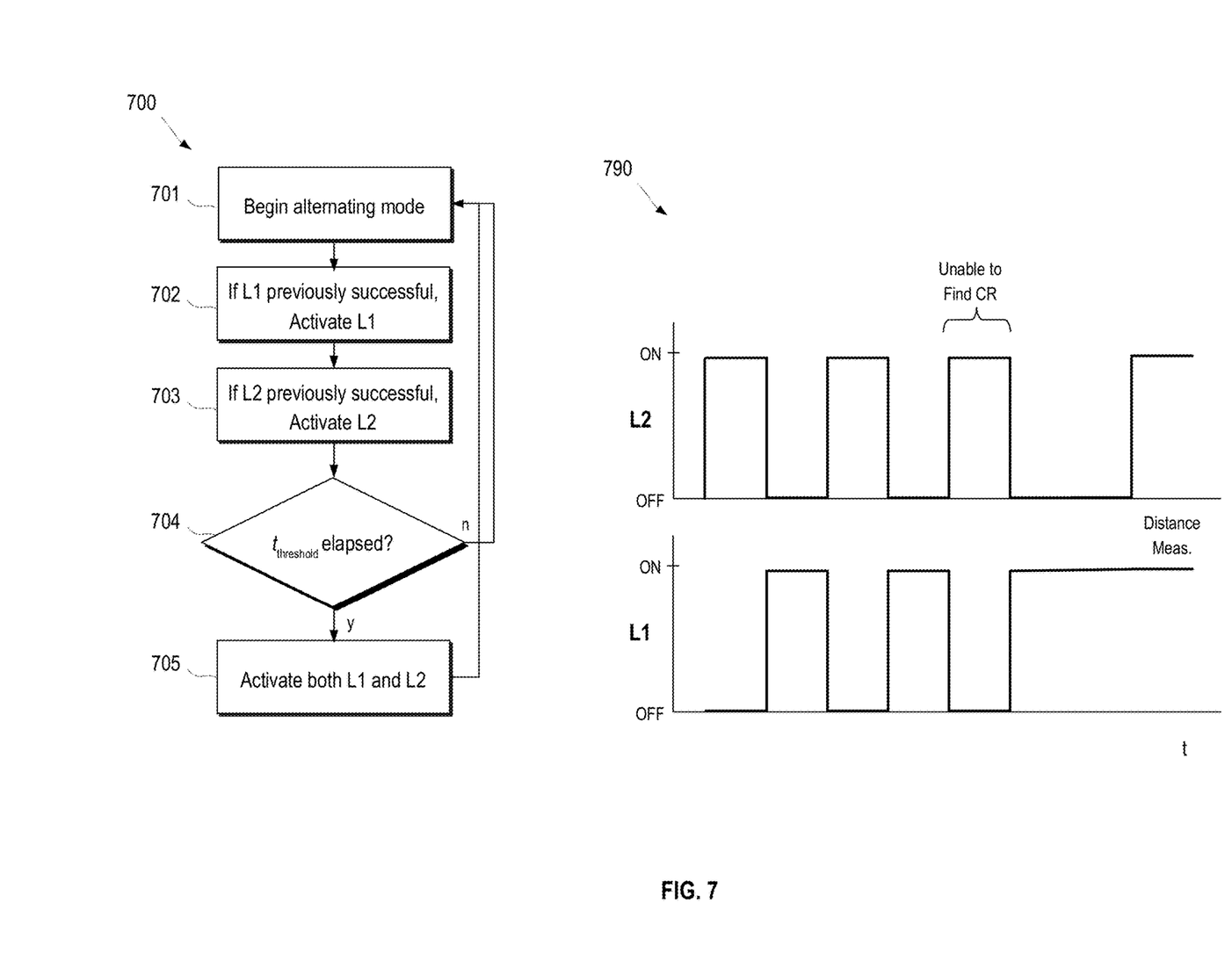
FIG. 7 is a conceptual block diagram and associated timing diagram for an illumination mode including alternating activation of a pair of LEDs with exceptions based on inability to determine a corneal reflection in the previous frame.

FIG. 7 includes a flowchart 700 and associated timing diagram 790 for an illumination mode that is a variation of that shown in FIG. 6, and is characterized by alternating back and forth between a pair of LEDs during successive time segments, but selecting a single LED for activation during a successive time segments in the event that a previous computation was unsatisfactory for a given LED (e.g., due to reflections from a user's glasses, or other external factor).

In this mode, as shown in flowchart 700, the system begins (in step 701) by entering an alternating mode as previously depicted in FIG. 6. In this variation however, L1 is activated at step 702 only if activation of L1 previously led to a successful result, and L2 is activated at step 703 only if activation of L2 previously led to a successful result. Subsequently, in step 705, L1 and L2 are both activated after some predetermined time has elapsed ($t_{threshold}$) 704.

In the event that the system is successful in performing its calculations by alternating back and forth between L1 and L2, then the illumination mode of FIG. 7 will proceed exactly as that shown in FIG. 6. If, however, as illustrated in timing diagram 790, the system was previously (e.g., within the last few time segments) unable to determine a CR using L2, then the system will choose to activate L1 instead of L2 during one or more subsequent time segments.

Accordingly, the illumination mode shown in FIG. 7 is advantageous in that, by generally illuminating only one LED at a time, the system can calculate a very precise PC measurement. At the same time, the intermittent activation of both LEDs allows for a reasonably precise $CR_{dist}$ and user distance measurement. Furthermore, this mode is robust to image data problems such as reflections from the user's glasses and the like.

Illumination Mode Example 3

Figure 8:
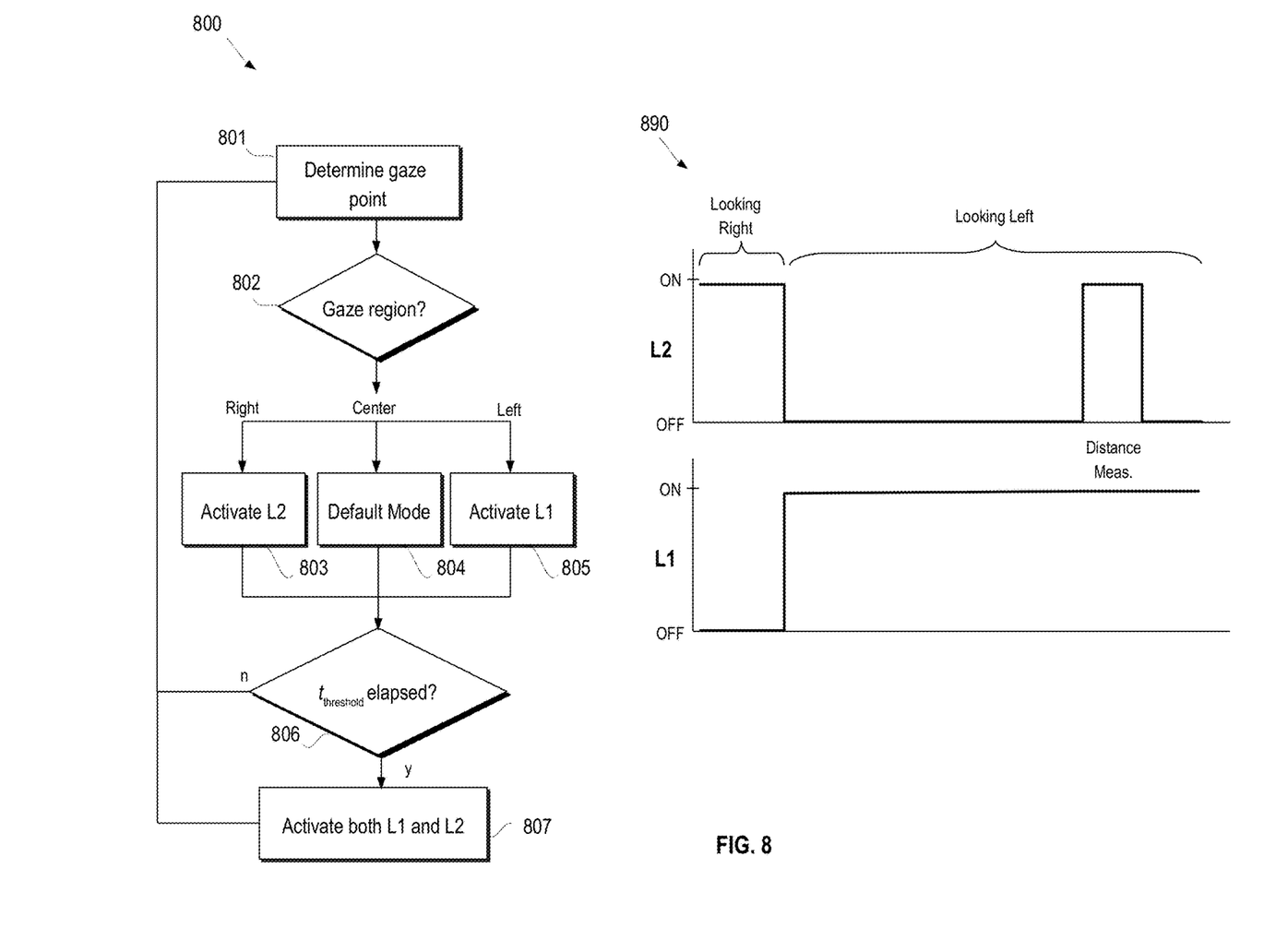
FIG. 8 is a conceptual block diagram and associated timing diagram for an illumination mode in which LED activation is based on the relative location of the gaze point on the display.

FIG. 8 includes a flowchart 800 and associated timing diagram 890 for an illumination mode characterized by activating a single illuminator based on the lateral position of the gaze point on the display. Simply put, when the user is looking toward the right side of the display, then the rightmost LED (i.e., L2) is activated, and when the user is looking toward the left side of the display, then the leftmost LED (i.e., L1) is activated.

Referring to flowchart 800, the gaze point is first determined as described above (step 801). Based on the gaze point, the gaze region is determined (step 802). If the gaze point falls within the "left" side of the display, then L1 is activated for that time segment (step 805). If the gaze point falls within the "right" side of the display, then L2 is activated for that time segment (step 803). If the gaze point is determined to fall within neither the left or the right, then some default mode is enabled (804). This default mode might correspond to a mode as discussed above with respect to FIG. 6 or 7, or may any other suitable mode. As with the embodiments discussed above, after a predetermined time has elapsed (step 806), both L1 and L2 are activated (step 807).

The terms "left" and "right" are used relative to the display 112 shown in FIG. 1 (i.e., parallel to the x-axis). However, the determination of what constitutes the "left" and "right" sides of the display for the purposes of this illumination mode may be based on any convenient geometric criterion. For example, the left side of the screen may be any point left of center, any point in the leftmost third of the screen, any point in the leftmost quarter of the display 112, or the like. The same holds for the right side of the display, which preferably has a symmetrical definition.

In addition, a form of "spatial hysteresis" may be incorporated into this determination. For example, it might be determined that the user is looking at the right side of the display if the x coordinate of the gaze point is greater than ½ the width of the display, but may require that the user's gaze point then move farther left than the midpoint to make the determination that the user is looking to the left side of the display.

Accordingly, the illumination mode shown in FIG. 8 is advantageous in that it provides more accurate CR measurements when the user's eyes are facing the extreme left or right edges of the display.

Figure 9A:
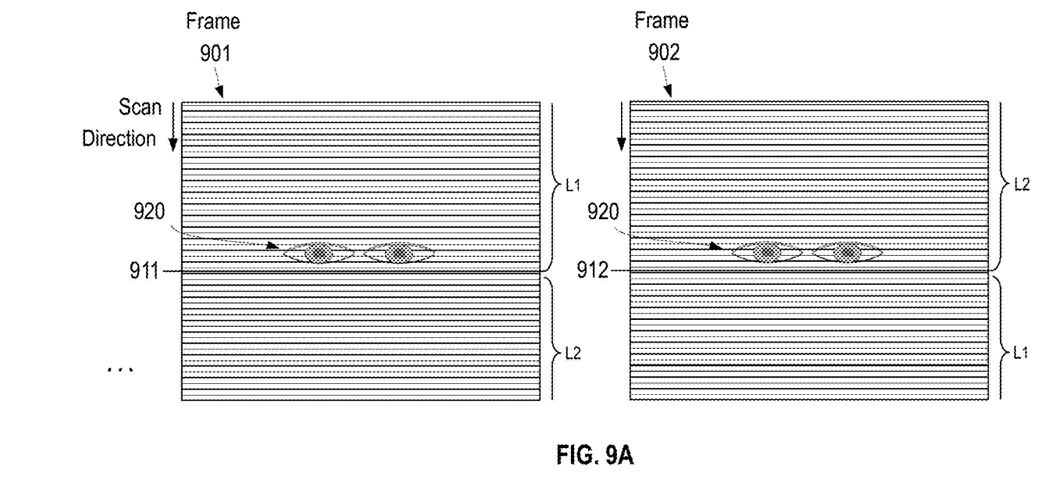
FIGS. 9A and 9B illustrates the interaction between time segments and actual frames in accordance with one embodiment.
Figure 9B:
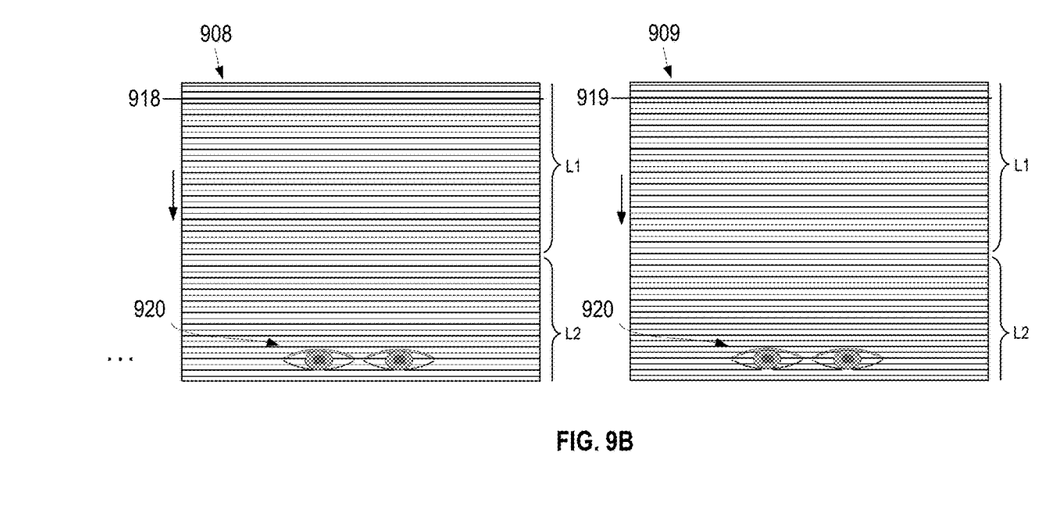

FIGS. 9A and 9B illustrate the interaction between time segments and actual frames in accordance with one embodiment. More particularly, FIG. 9A illustrates two successive frames (frames 901 and 902) within which the eye-tracking camera generates images of the user's eyes 920. In FIG. 9A, the eyes 920 are near the middle of each frame, while in FIG. 9B the eyes 920 are near the bottom of the frame. Each frame includes a series of individual horizontal raster lines that progress in time from top to bottom, consistent with the operation of certain types of CMOS cameras.

Within frame 901, L1 is illuminated from the top of the frame through to line 911, at which time L2 is illuminated until line 912 in frame 902 is reached. Subsequent to line 912, L1 is again illuminated. This process repeats from frame to frame. The relevant time segment in FIG. 9A extends from line 911 to 912. FIG. 9B illustrates another embodiment in which the horizontal lines 918 and 919 demarcate the beginning and end of individual time segments in successive frames 908 and 909. Thus, as can be seen, the individual time segments may correspond, substantially, to individual frames, or they may not, depending upon the location of the user's eyes and other factors.

While the above non-limiting examples illustrate the advantages provided by independently operable illuminators and associated illumination modes, in a broader sense the present invention also allows for adaptivity in selecting between those illumination modes during a particular eye-tracking session.

Figure 10:
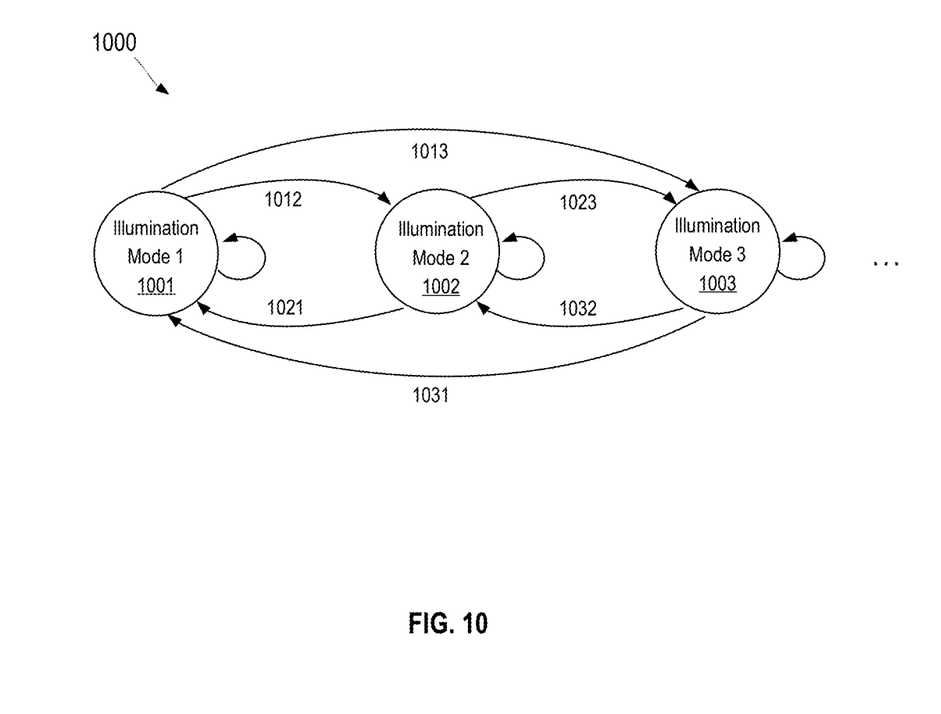
FIG. 10 is a conceptual state diagram illustrating adaptive selection of illumination modes in accordance with one embodiment.

That is, referring now to the state diagram 1000 shown in FIG. 10, the system may transition between a set of illumination modes that includes a mode 1 (1001), a mode 2

(1002), and a mode 3 (1003) in response to the occurrence of specified events or conditions, which are denoted by arrows 1012, 1023, 1021, 1032, 1013, and 1031.

For example, consider the case where mode 1 corresponds to a fallback mode in which both L1 and L2 are activated each time segment, mode 2 corresponds to an alternating mode as illustrated in FIG. 6, and mode 3 corresponds to the left-right mode illustrated in FIG. 8.

The system may begin in mode 1 (1001) during initial calibration and start-up, and then, after a certain time has elapsed or a particular stability has been reached, transition (via arrow 1012), to mode 2. Subsequently, it might be determined that the user is focusing on one side of the screen, triggering the transition (via arrow 1023) to mode 3. Shortly thereafter, when the user's gaze point has moved closer to the center, the system may then transition back (via arrow 1032) to mode 2.

In summary, what has been described are various systems and methods for independently operable illuminators in eye-tracking systems.

A method in accordance with one embodiment includes: providing a first infrared illumination source; providing a second infrared illumination source; receiving, with a camera assembly, infrared light reflected from a user's face during activation of the first and second infrared illumination sources and producing image data associated therewith; and a processor communicatively coupled to the camera assembly and the first and second illumination sources. The processor is configured to selectively activate the first and second illumination sources in accordance with a plurality of illumination modes and to produce eye-tracking data based on the image data; wherein the plurality of illumination modes includes: a first illumination mode in which both the first and second infrared illumination source are activated in each time segment of the image data; and a second illumination mode in which the first and second infrared illumination sources are individually activated in alternating time segments of the image data.

A multi-modal eye-tracking system in accordance with one embodiment includes: a first infrared illumination source; a second infrared illumination source; a camera assembly configured to receive infrared light reflected from a user's face during activation of the first and second infrared illumination sources and to produce image data comprising a series of time segments associated therewith; and a processor communicatively coupled to the camera assembly and the first and second illumination sources, the processor configured to selectively activate the first and second illumination sources in accordance with a plurality of illumination modes and to produce eye-tracking data based on the image data. The plurality of illumination modes includes: a first illumination mode in which both the first and second infrared illumination source are activated in each time segment of the image data; and a second illumination mode in which the first and second infrared illumination sources are individually activated in alternating time segments of the image data.

Embodiments of the present disclosure may be described in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, field-programmable gate arrays (FPGAs), Application Specific Integrated Circuits (ASICs), logic elements, look-up tables, or the like, which may carry out a variety of functions under the control of one or more microprocessors or other control devices.

In addition, the various functional modules described herein may be implemented entirely or in part using a machine learning or predictive analytics model. In this regard, the phrase "machine learning" model is used without loss of generality to refer to any result of an analysis that is designed to make some form of prediction, such as predicting the state of a response variable, clustering patients, determining association rules, and performing anomaly detection. Thus, for example, the term "machine learning" refers to models that undergo supervised, unsupervised, semi-supervised, and/or reinforcement learning. Such models may perform classification (e.g., binary or multiclass classification), regression, clustering, dimensionality reduction, and/or such tasks. Examples of such models include, without limitation, artificial neural networks (ANN) (such as a recurrent neural networks (RNN) and convolutional neural network (CNN)), decision tree models (such as classification and regression trees (CART)), ensemble learning models (such as boosting, bootstrapped aggregation, gradient boosting machines, and random forests), Bayesian network models (e.g., naive Bayes), principal component analysis (PCA), support vector machines (SVM), clustering models (such as K-nearest-neighbor, K-means, expectation maximization, hierarchical clustering, etc.), linear discriminant analysis models.

Any of the eye-tracking data generated by system 100 may be stored and handled in a secure fashion (i.e., with respect to confidentiality, integrity, and availability). For example, a variety of symmetrical and/or asymmetrical encryption schemes and standards may be employed to securely handle the eye-tracking data at rest (e.g., in system 100) and in motion (e.g., when being transferred between the various modules illustrated above). Without limiting the foregoing, such encryption standards and key-exchange protocols might include Triple Data Encryption Standard (3DES), Advanced Encryption Standard (AES) (such as AES-128, 192, or 256), Rivest-Shamir-Adelman (RSA), Twofish, RC4, RC5, RC6, Transport Layer Security (TLS), Diffie-Hellman key exchange, and Secure Sockets Layer (SSL). In addition, various hashing functions may be used to address integrity concerns associated with the eye-tracking data.

In addition, those skilled in the art will appreciate that embodiments of the present disclosure may be practiced in conjunction with any number of systems, and that the systems described herein are merely exemplary embodiments of the present disclosure. Further, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the terms "module" or "controller" refer to any hardware, software, firmware, electronic control component, processing logic, and/or processor device, individually or in any combination, including without limitation: application specific integrated circuits (ASICs), field-programmable gate-arrays (FPGAs), dedicated neural network devices (e.g., Google Tensor Processing Units), electronic circuits, processors (shared, dedicated, or group) configured to execute one or more software or firmware programs, a combinational logic circuit, and/or other suitable components that provide the described functionality.

As used herein, the word "exemplary" means "serving as an example, instance, or illustration." Any implementation described herein as "exemplary" is not necessarily to be construed as preferred or advantageous over other implementations, nor is it intended to be construed as a model that must be literally duplicated.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

The invention claimed is:

1. A multi-modal eye-tracking system comprising:
   a first infrared illumination source;
   a second infrared illumination source;
   a camera assembly configured to receive infrared light reflected from a user's face during activation of the first and second infrared illumination sources and to produce image data comprising a series of time segments associated therewith; and
   a processor communicatively coupled to the camera assembly and the first and second illumination sources, the processor configured to selectively activate the first and second illumination sources in accordance with a plurality of illumination modes and to produce eye-tracking data based on the image data;
   wherein the plurality of illumination modes includes: a first illumination mode in which both the first and second infrared illumination source are activated in each time segment of the image data; and a second illumination mode in which the first and second infrared illumination sources are individually activated in alternating time segments of the image data; wherein the plurality of illumination modes further includes:
   an alternating illumination mode in which the first and second infrared illumination sources are individually activated in alternating time segments of the image data, except that the first infrared illumination source is activated in the event determination of the eye-tracking data was unsuccessful during a previous time segment in which the second infrared illumination source was activated.

2. The multi-modal eye-tracking system of claim 1, wherein the image data includes:
   (a) a first pupil center (PC), a first corneal reflection (CR), and a second CR associated with a first eye of the user; and
   (b) a second PC, a third CR, and a fourth CR associated with a second eye of the user.

3. The multi-modal eye-tracking system of claim 1, wherein the plurality of illumination modes further includes:
   a third illumination mode in which the first and second infrared illumination sources are individually activated in alternating time segments of the image data, except that both the first and second infrared illumination sources are activated at a predetermined interval.

4. The multi-modal eye-tracking system of claim 1, wherein the plurality of illumination modes further includes:
   a fourth illumination mode in which the first and second infrared illumination sources are individually activated based on the location of a gaze point of the user.

5. A method of performing multi-modal eye-tracking, the method comprising:
   providing a first infrared illumination source;
   providing a second infrared illumination source;
   receiving, with a camera assembly, infrared light reflected from a user's face during activation of the first and second infrared illumination sources and producing image data associated therewith; and
   a processor communicatively coupled to the camera assembly and the first and second illumination sources, the processor configured to selectively activate the first and second illumination sources in accordance with a plurality of illumination modes and to produce eye-tracking data based on the image data;
   wherein the plurality of illumination modes includes: a first illumination mode in which both the first and second infrared illumination source are activated in each time segment of the image data; and a second illumination mode in which the first and second infrared illumination sources are individually activated in alternating time segments of the image data; wherein the plurality of illumination modes further includes:
   an alternating illumination mode in which the first and second infrared illumination sources are individually activated in alternating time segments of the image data, except that the first infrared illumination source is activated in the event determination of the eye-tracking data was unsuccessful during a previous time segment in which the second infrared illumination source was activated.

6. The method of claim 5, wherein the image data includes:
   (a) a first pupil center (PC), a first corneal reflection (CR), and a second CR associated with a first eye of the user; and
   (b) a second PC, a third CR, and a fourth CR associated with a second eye of the user.

7. The method of claim 5, wherein the plurality of illumination modes further includes:
   a third illumination mode in which the first and second infrared illumination sources are individually activated in alternating time segments of the image data, except that both the first and second infrared illumination sources are activated at a predetermined interval.

8. The method of claim 5, wherein the plurality of illumination modes further includes:
   a fourth illumination mode in which the first and second infrared illumination sources are individually activated based on the location of a gaze point of the user.

9. A computing device comprising:
   a display;
   a multi-modal eye-tracking system coupled to the display, the multi-modal eye-tracking system comprising a first infrared illumination source, a second infrared illumination source, and a camera assembly configured to receive infrared light reflected from a user's face during activation of the first and second infrared illumination sources and to produce image data comprising a series of time segments associated therewith; and
   a processor communicatively coupled to the display, the camera assembly, and the first and second illumination sources, the processor configured to selectively activate the first and second illumination sources in accordance with a plurality of illumination modes and to produce eye-tracking data based on the image data;
   wherein the plurality of illumination modes includes: a first illumination mode in which both the first and second infrared illumination source are activated in each time segment of the image data; and a second illumination mode in which the first and second infrared illumination sources are individually activated in alternating time segments of the image data; wherein the plurality of illumination modes further includes:

an alternating illumination mode in which the first and second infrared illumination sources are individually activated in alternating time segments of the image data, except that the first infrared illumination source is activated in the event determination of the eye-tracking data was unsuccessful during a previous time segment in which the second infrared illumination source was activated.

10. The computing device of claim 9, wherein the image data includes:
   (a) a first pupil center (PC), a first corneal reflection (CR), and a second CR associated with a first eye of the user; and
   (b) a second PC, a third CR, and a fourth CR associated with a second eye of the user.

11. The computing device of claim 9, wherein the plurality of illumination modes further includes:
   a third illumination mode in which the first and second infrared illumination sources are individually activated in alternating time segments of the image data, except that both the first and second infrared illumination sources are activated at a predetermined interval.

12. The computing device of 9, wherein the plurality of illumination modes further includes:
   a fourth illumination mode in which the first and second infrared illumination sources are individually activated based on the location of a gaze point of the user.

\* \* \* \* \*